United States Patent [19]
DiGiacomo

[11] 3,798,515
[45] Mar. 19, 1974

[54] FUEL IMMERSIBLE CAPACITOR FOR MEASUREMENT OF MASS OF LIQUID FUEL IN A TANK

[75] Inventor: Sebastian F. DiGiacomo, Merrick, N.Y.

[73] Assignee: Gull Airborne Instruments, Inc., Smithtown, N.Y.

[22] Filed: Mar. 24, 1972

[21] Appl. No.: 237,718

[52] U.S. Cl............... 317/246, 73/304, 317/249 R, 324/72.5, 339/103 R
[51] Int. Cl............................................. H01g 5/01
[58] Field of Search......... 317/246, 249 R; 174/135; 339/103 R

[56] References Cited
UNITED STATES PATENTS

| | | | |
|---|---|---|---|
| 2,560,757 | 7/1951 | Bowar | 317/246 |
| 2,824,270 | 2/1958 | Anderson | 317/246 |
| 2,950,426 | 8/1960 | Frome | 317/246 |
| 3,260,903 | 7/1966 | Kumano | 317/246 |
| 3,315,040 | 4/1967 | Brorein | 174/135 X |
| 3,437,980 | 4/1969 | Smith | 339/103 R |
| 3,524,116 | 8/1970 | Bray | 317/246 |

Primary Examiner—E. A. Goldberg
Attorney, Agent, or Firm—Cooper, Dunham, Clark, Griffin & Moran

[57] ABSTRACT

Capacitance apparatus for measuring the mass of liquid fuel in the tanks of an aircraft. The capacitance elements and other parts of the circuit are designed to have very high accuracy, so that no calibrating adjustment is required during or after installation. Apparatus is provided for electrically inspecting the capacitance elements without removing them from their operating positions. This apparatus includes a fault isolation probe having terminals connected by slack conductors to the capacitance elements. The fault isolation probe is mounted in the tank, and is removable from the tank without interrupting the circuit connections to the capacitors, so that after withdrawing the fault isolation probe from the tank, electrical tests of the capacitors may be made through the slack conductors, while leaving the capacitors in their operating positions. Fuel level measuring capacitors are provided, as well as capacitors for compensating for changes in the dielectric constant of the fuel.

6 Claims, 30 Drawing Figures

PATENTED MAR 19 1974 3,798,515

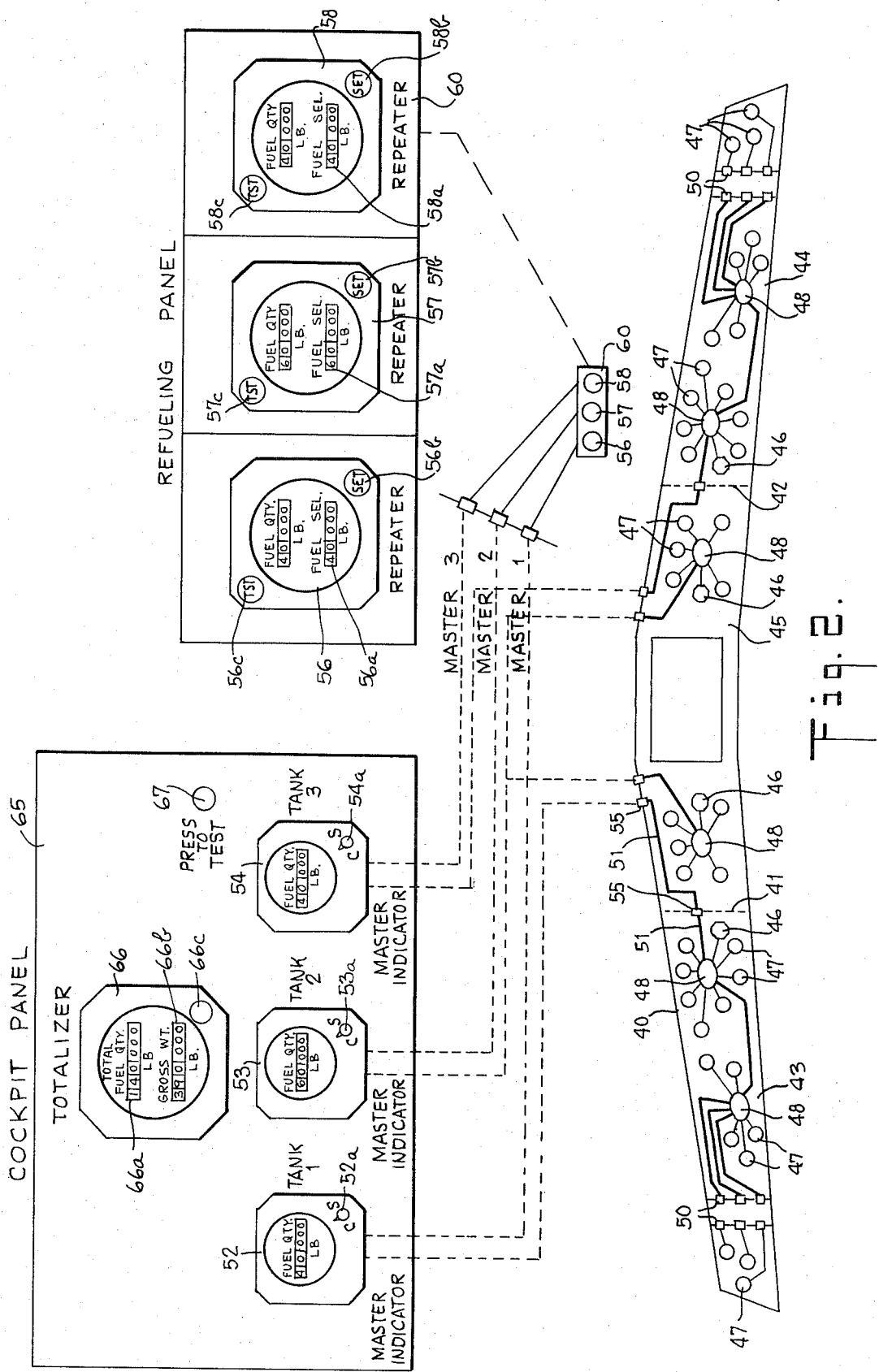

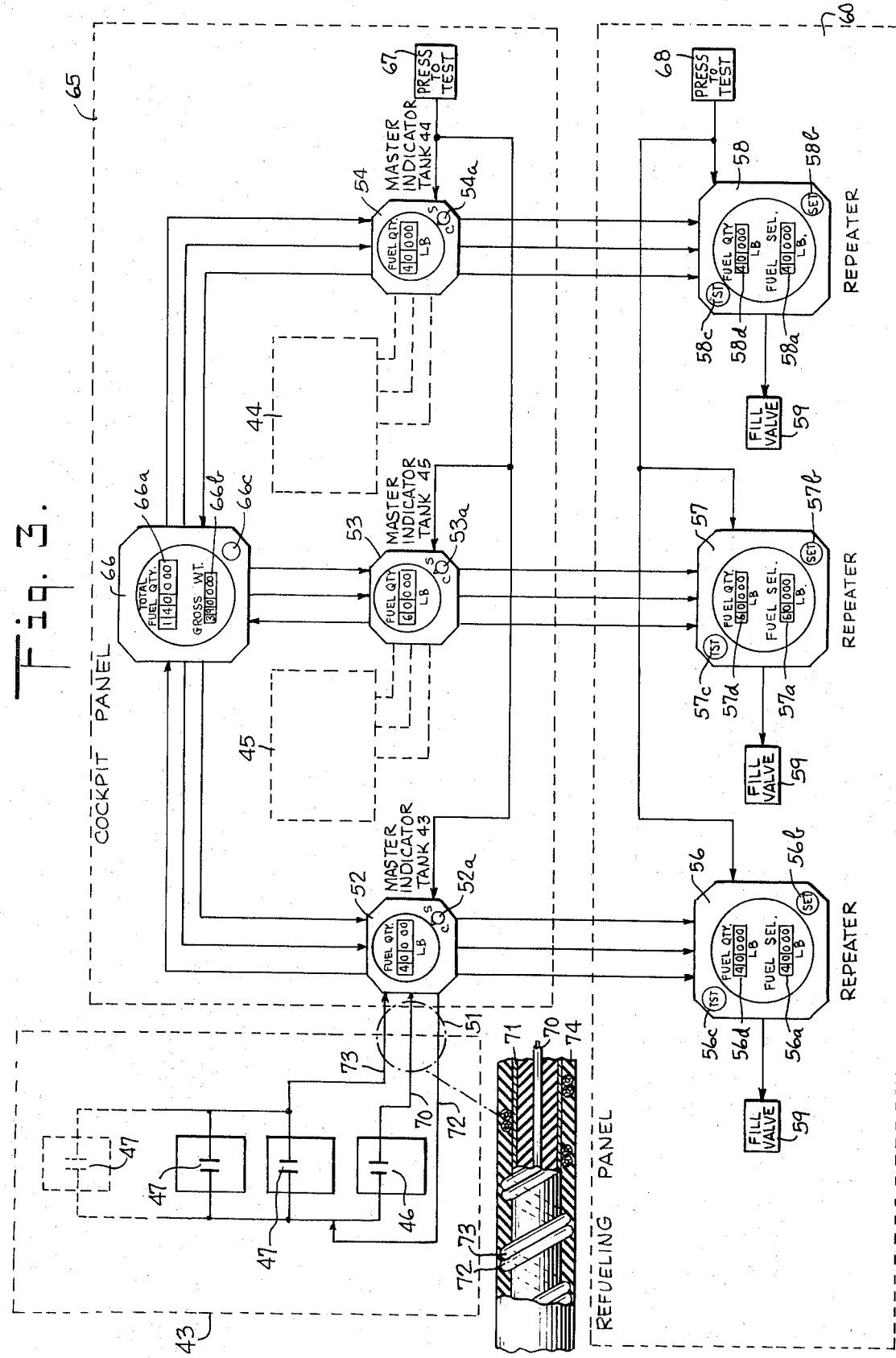

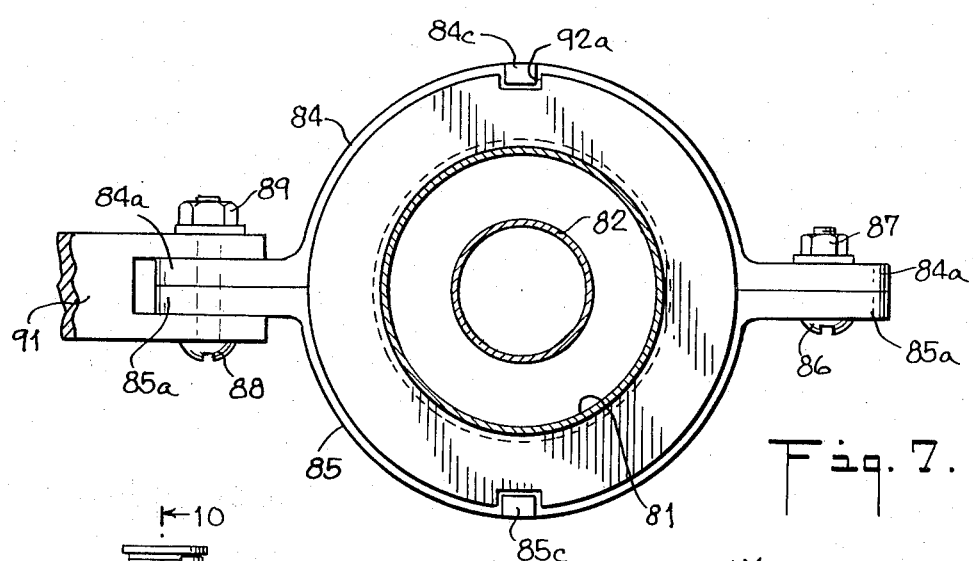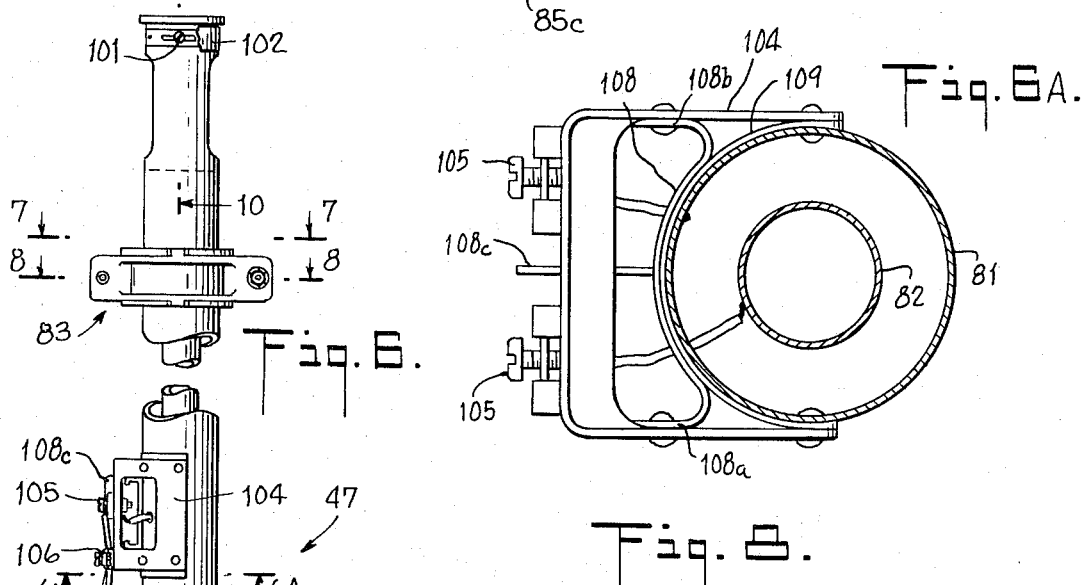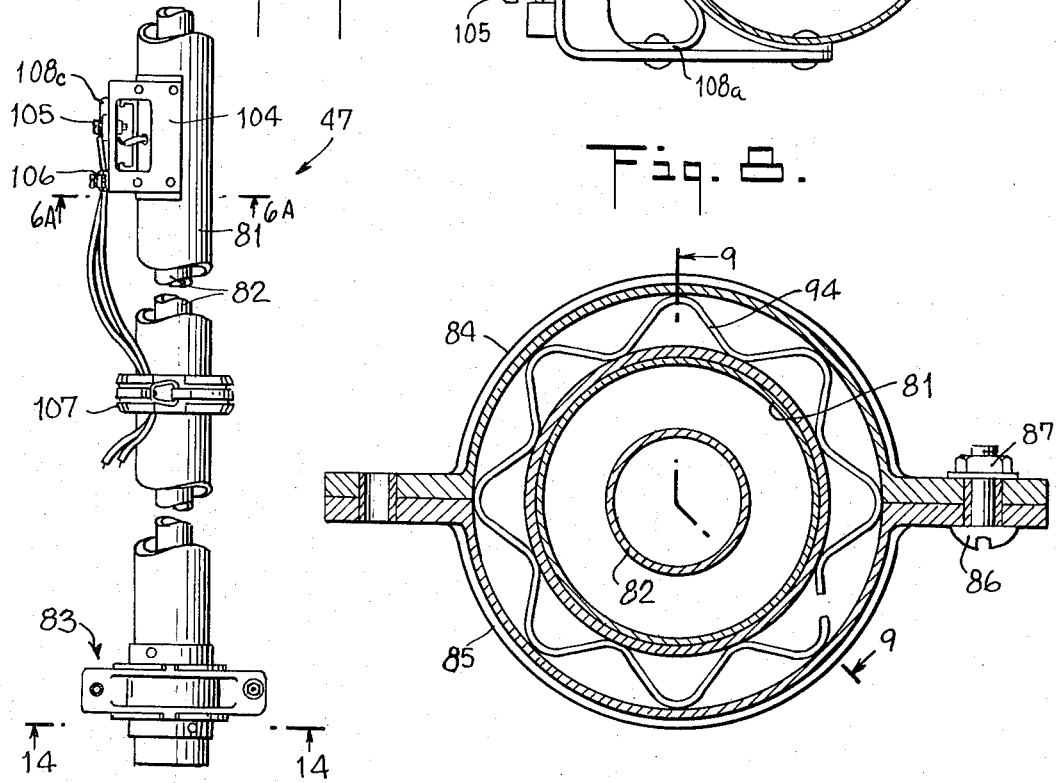

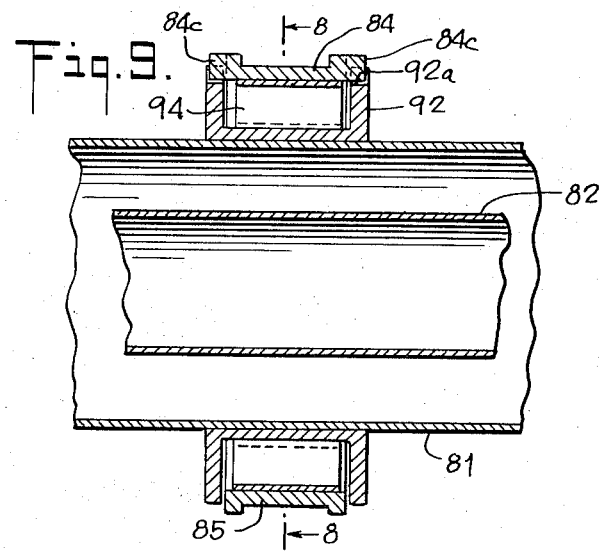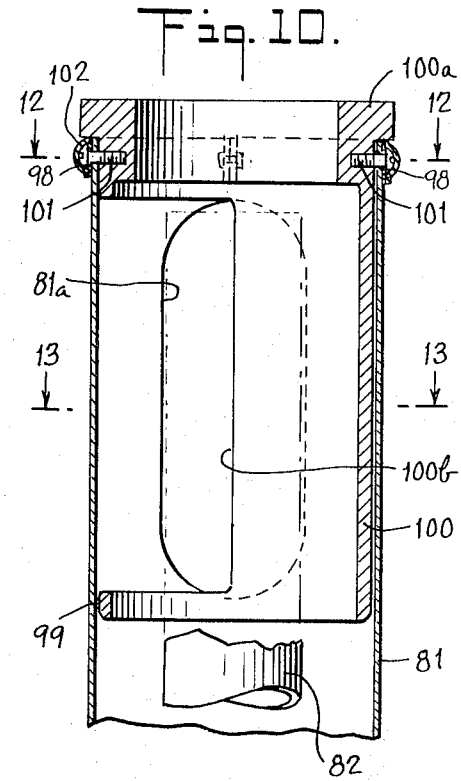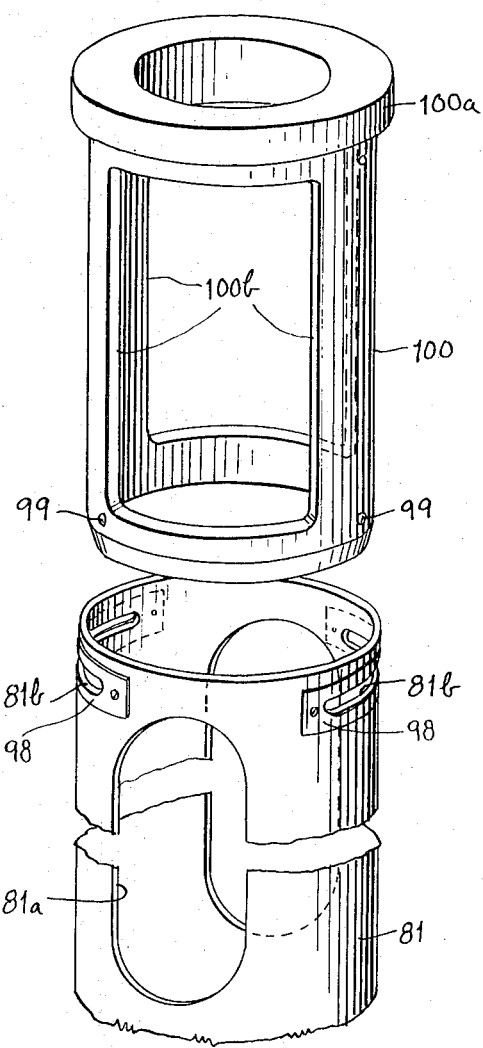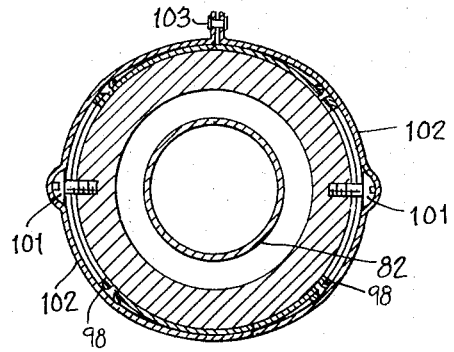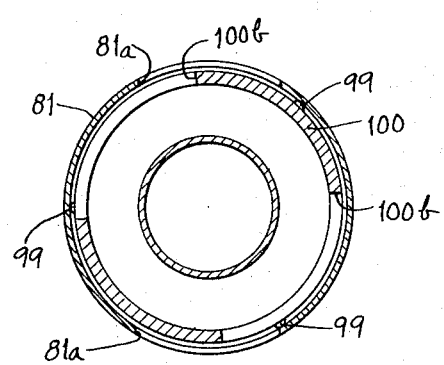

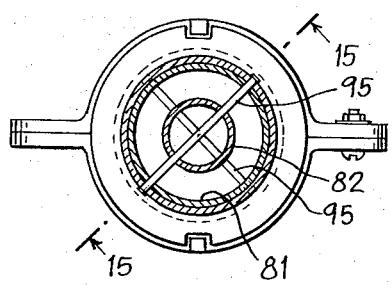
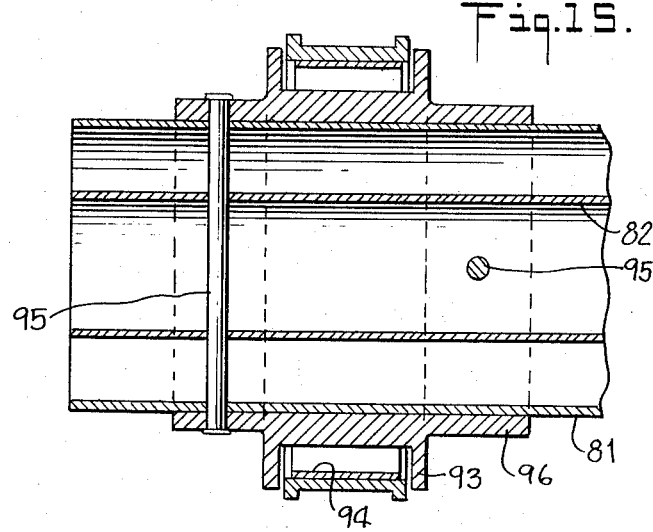
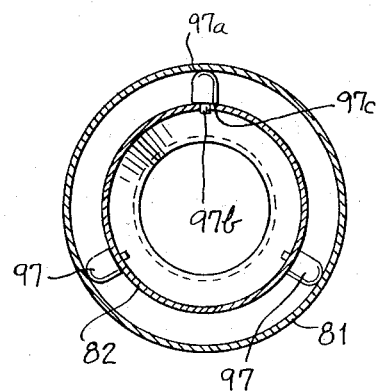

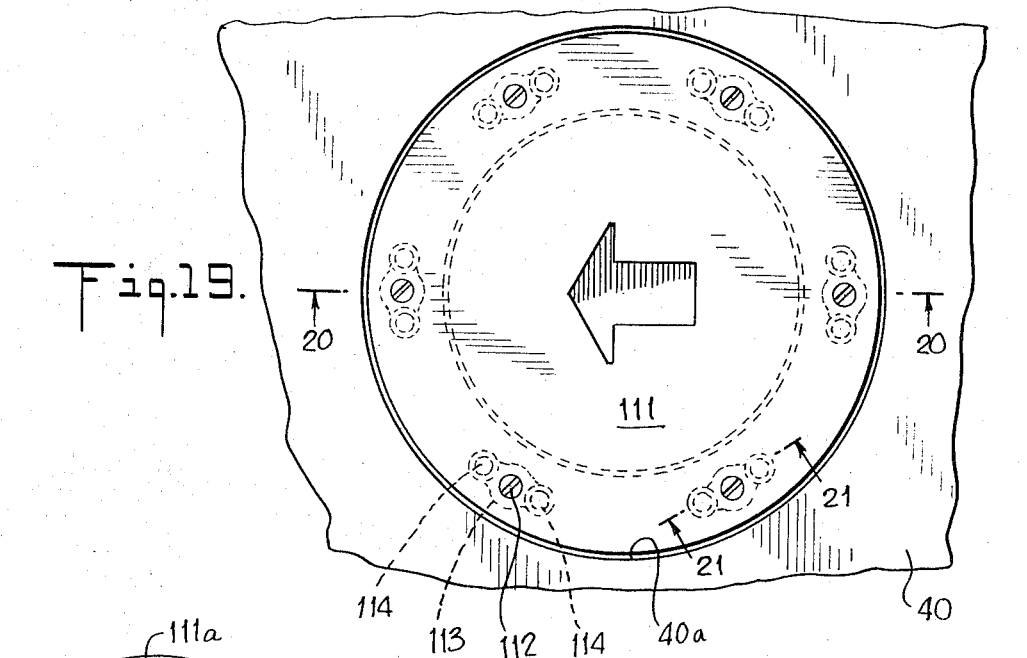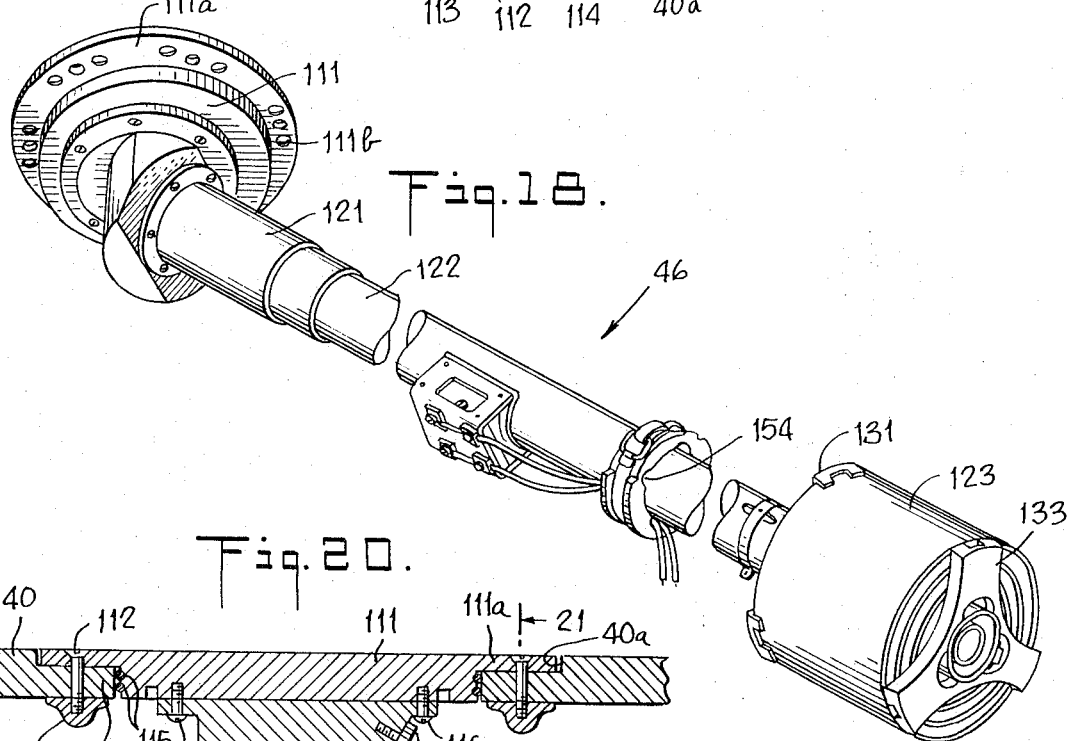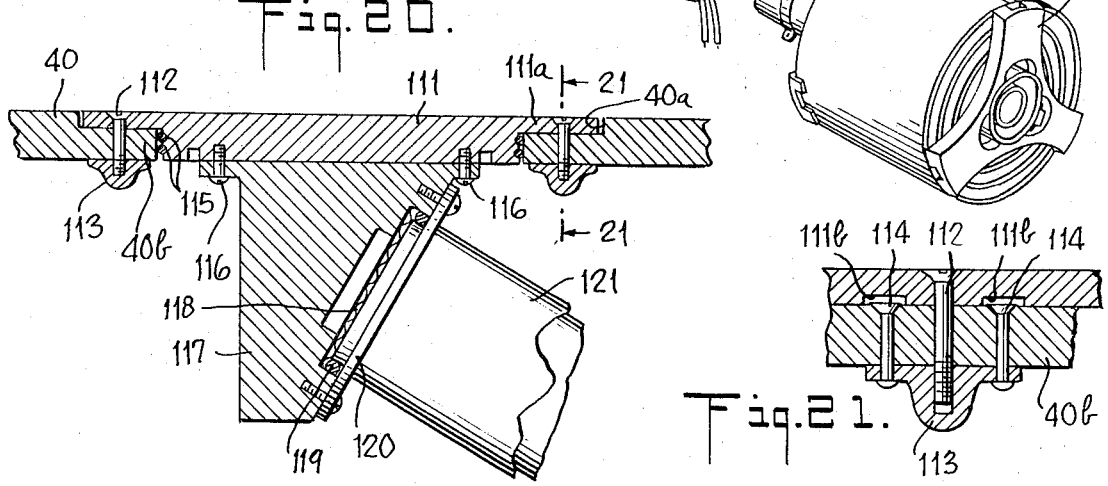

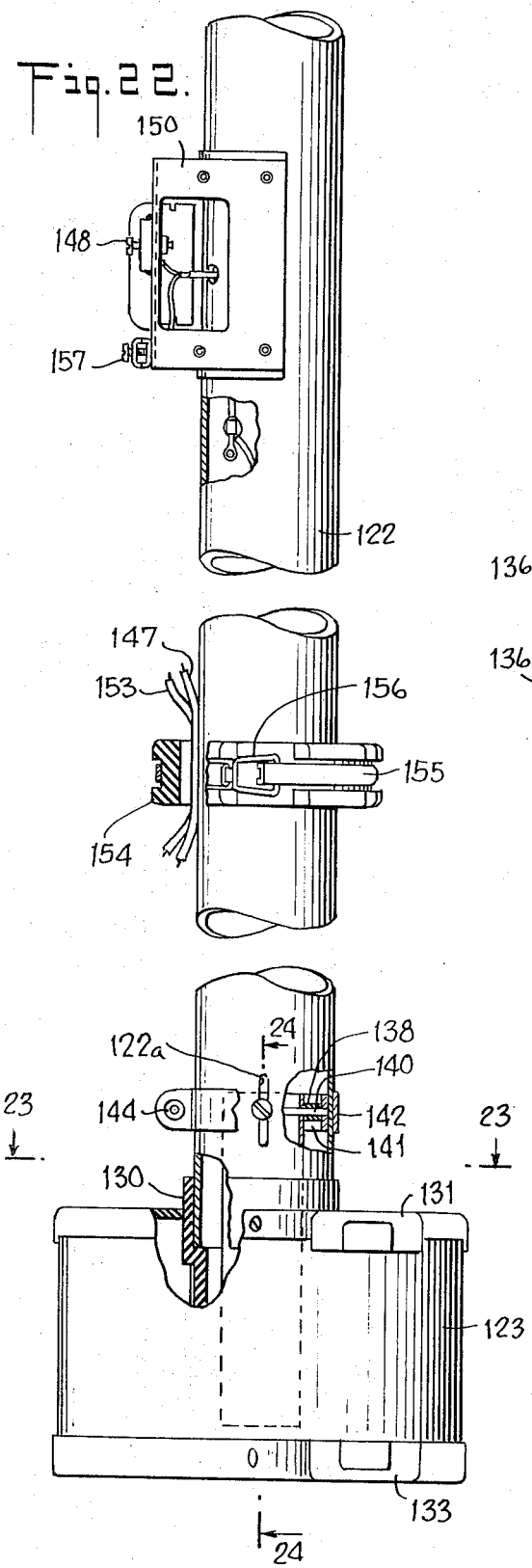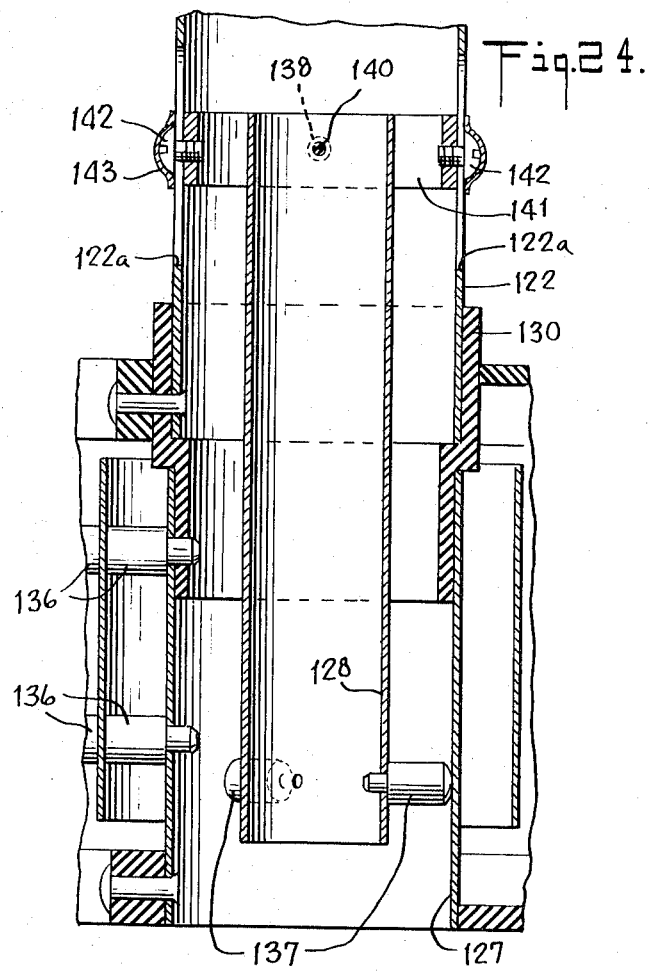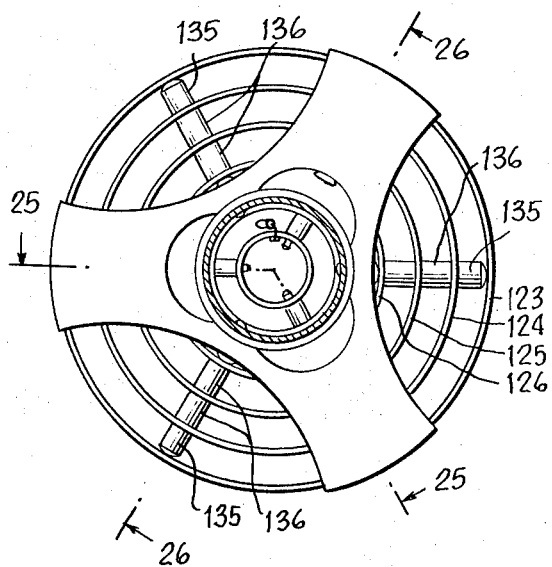

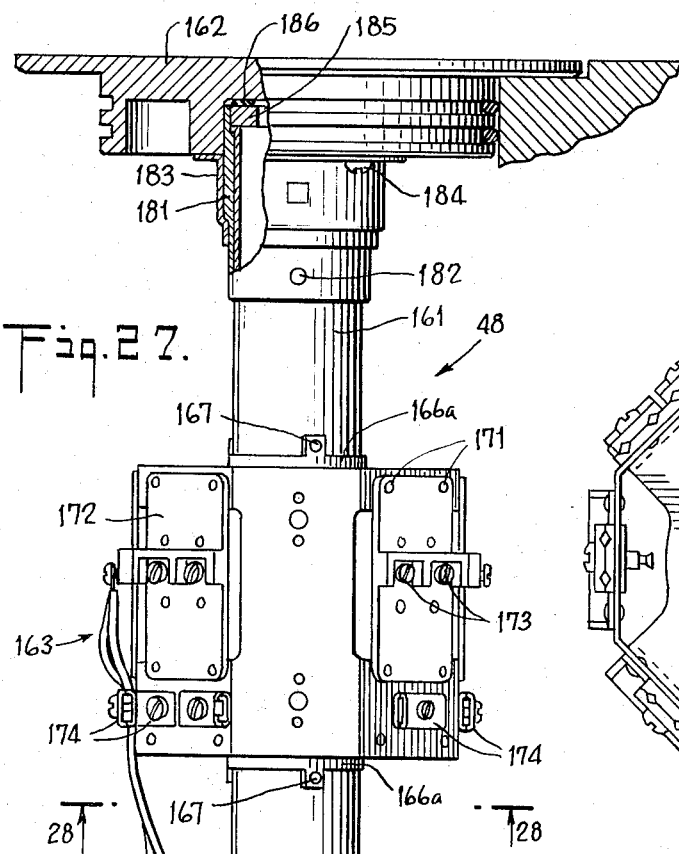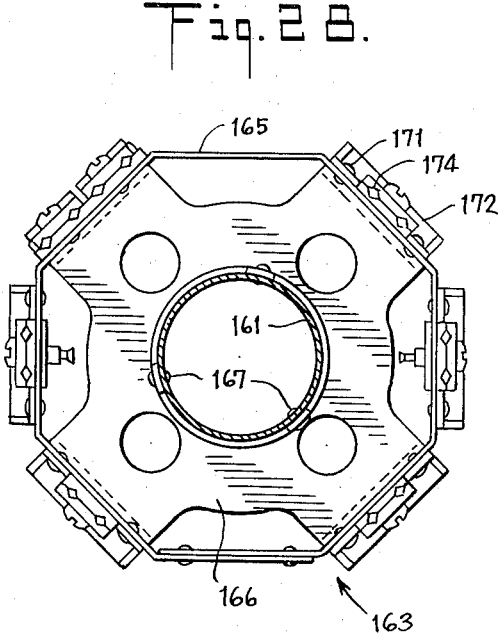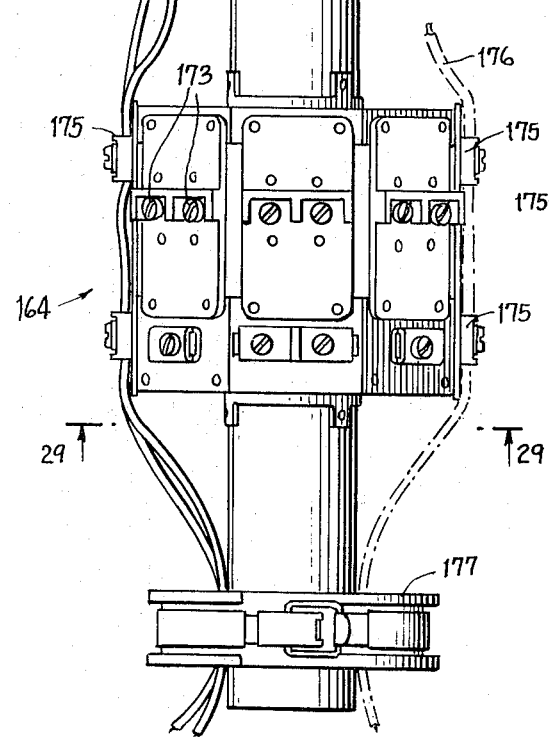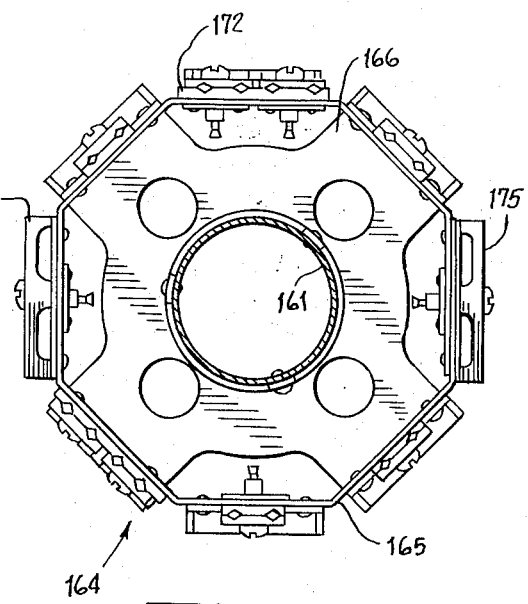

3,798,515

FUEL IMMERSIBLE CAPACITOR FOR MEASUREMENT OF MASS OF LIQUID FUEL IN A TANK

CROSS-REFERENCE

The apparatus described in this application is intended for use with the digital indicating and control system shown and described in the copending application of Walter Hersch and Ira A. Rubel, Ser. No. 275,765, filed July 27, 1972. The present invention has substantial utility, however, in connection with other indicating and control systems.

BRIEF SUMMARY OF THE INVENTION

Fuel mass measuring apparatus includes, in each tank in which the fuel is to be measured, at least one level measuring capacitor, one compensating capacitor, and a fault isolation probe. These capacitors and the probe are capable of functioning either when immersed in fuel or when not so immersed. The terminals of each capacitor in a tank are connected to terminals on the fault isolation probe of that tank through slack conductors. Sufficient slack is allowed in the conductors so that the isolation probe with its terminals may be withdrawn from the tank without disconnecting the conductors, thereby giving access at the terminals to electrical connections to each capacitor individually. The separate capacitors may be tested by the use of those connections.

Each fault isolation probe includes an elongated support tube and a pair of spaced terminal assemblies attached thereto. The low voltage terminals of all capacitors are mounted on the assembly nearest the upper end of the support tube. The high voltage terminals and a set of strain relief clamps are mounted on the other assembly. The slack wires leading to the low voltage terminals pass under the strain relief clamps on the high voltage terminal assembly. The outer end of the support tube is mounted in an outer wall of the tank by means of a flanged plate and sealing means. The flanged plate is held in place on the wall of the tank by means of flush head screws. The flanged plate is provided with recesses in its under surface aligned with the heads of the dome nut rivets so as to insure good electrical contact between the broad surface of the flange on the plate and the broad surface of the flange on the tank wall, thereby avoiding point contact between any rivet and the flanged plate. Such point contacts might cause undesirable sparking under electric discharge conditions, such as could be produced by lightning.

Other slack wire connections extend from the fault isolation probe to a connector in a bulkhead wall of the tank. From the other side of the connector, conductors extend to an electrical measuring system including a potential supply means, a balanceable circuit, an indicator, and means responsive to a potential in the circuit for rebalancing the circuit and driving the indicator.

Each level measuring capacitor consists of two concentric cylinders, the outer cylinder having an open window adjacent one end. The outer cylinder is provided with a sleeve in electrical contact with the cylinder and rotatable in the cylinder to vary the alignment between a window in the sleeve and the window in the outer cylinder, thereby varying the capacitance of the capacitor. Improved shock absorbing supports are provided for the outer cylinder. These supports are adapted to be mounted on the wall of the tank. The inner cylinder is supported against longitudinal and circumferential movement with respect to the outer cylinder by means of a pair of elongated pins which extend diametrically through the cylinders and through a mounting sleeve on one of the supporting brackets. The inner cylinder is held against radial movement with respect to the outer cylinder by means of a plurality of radially extending insulating buttons, each having an outer convex surface adapted to engage the inner surface of the outer cylinder and having a radially directed inner end comprising a projecting shank adapted to be received in an opening in the inner cylinder. The shank is surrounded by a shoulder which abuts against the outer surface of the inner cylinder.

The compensating capacitor comprises a plurality of concentric cylinders held against lateral movement with respect to each other by a plurality of arrays of interfitting radially extending insulating buttons. One set of alternate concentric plates of the compensating capacitor are electrically connected to each other and to a terminal of the capacitor. The other set of alternating plates, including the innermost plate, are electrically connected to each other and to the other capacitor terminal. The innermost plate is slidable axially of the array of concentric cylindrical plates to vary the capacitance for calibration purposes. This innermost plate extends axially beyond the other plates and has its extending end mounted on a ring slidable in an elongated support tube, which also supports the other concentric cylinders. The calibration adjustment is accomplished by sliding that ring axially and fixing it in place by means of screw and slot connections. The support tube is mounted at its outer end on a flanged plate similar to that employed for supporting the fault isolation probe. The inner end of the support tube, which carries the compensating capacitor, has an insulating sleeve fitted thereon. The sleeve has an inner shoulder against which the end of the support tube abuts. The sleeve also has an outer shoulder against which the end of the innermost one of the other cylindrical capacitor elements abuts.

DRAWINGS

FIG. 2 is a schematic illustration of another more complex form of fuel measuring system in which the present invention is employed.

FIG. 3 is a schematic view, similar to FIG. 2, but showing the fuel tanks only diagrammatically and functionally illustrating the transfer of data between the other elements of the system more completely.

FIG. 6 is an elevational view of a fuel level measuring capacitance element, with certain parts broken away.

FIG. 6A is a fragmentary cross-sectional view, taken along the line 6A—6A of FIG. 6.

FIG. 7 is a view taken on the line 7—7 of FIG. 6.

FIG. 8 is a view taken on the line 8—8 of FIGS. 6 and 9.

FIG. 9 is a fragmentary view taken on the line 9—9 of FIG. 8.

FIG. 10 is a fragmentary view taken on the line 10—10 of FIG. 6.

FIG. 11 is an exploded view of certain of the parts shown in FIG. 10.

FIG. 12 is a sectional view taken on the line 12—12 of FIG. 10.

FIG. 13 is a sectional view taken on the line 13—13 of FIG. 10.

FIG. 14 is a sectional view on the line 14—14 of FIG. 6.

FIG. 15 is a sectional view on the line 15—15 of FIG. 14.

FIG. 16 is a sectional view taken on the line 10—10 of FIG. 6, but on a smaller scale.

FIG. 17 is a view taken on the line 17—17 of FIG. 16.

FIG. 18 is a perspective view of a compensating capacitor constructed in accordance with the invention.

FIG. 19 is a plan view of the mounting plate of a compensating capacitor mounted in place on an aircraft wing.

FIG. 20 is a sectional view on the line 20—20 of FIG. 19.

FIG. 21 is a sectional view taken on the line 21—21 of FIG. 20.

FIG. 22 is a fragmentary elevational view of the capacitor of FIG. 18, on a larger scale.

FIG. 23 is a view on the line 23—23 of FIG. 22.

FIG. 24 is a sectional view on the line 24—24 of FIG. 22.

FIG. 27 is an elevational view of a fault isolation probe constructed in accordance with the invention.

FIG. 28 is a sectional view on the line 28—28 of FIG. 27.

FIG. 29 is a sectional view on the line 29—29 of FIG. 27.

DETAILED DESCRIPTION

FIG. 1

Figure 1:
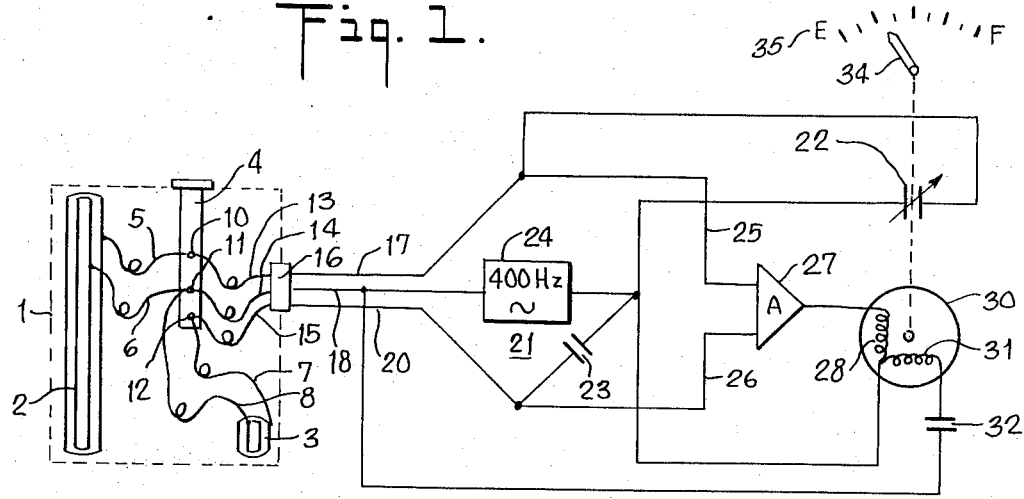
FIG. 1 is a diagrammatic illustration of one form of fuel measuring system including fuel immersible elements embodying the present invention.

This figure illustrates diagrammatically a fuel mass measuring system in which the fuel immersed portions embody certain features of the invention. Other parts of the system are highly simplified. The system shown includes a fuel tank 1 in which are located a fuel level measuring capacitor 2, a compensating capacitor 3 and a fault isolation probe 4. The terminals of the capacitor 2 are connected by means of slack conductors 5 and 6 to terminals 10 and 11 on the fault isolation probe 4. The terminals on the capacitor 3 are connected through slack conductors 7 and 8 to terminals 11 and 12 on the fault isolation probe 4. The three terminals 10, 11 and 12 on the fault isolation probe 4 are connected respectively through slack conductors 13, 14 and 15 to an electrical connector 16 fixed in a wall of the tank 1. The conductors 13, 14 and 15 are connected through that connector 16 to conductors 17, 18 and 20 which form part of a capacitance bridge circuit generally indicated at 21.

The level measuring capacitor 2 is connected in one arm of the bridge and the compensating capacitor 3 in an adjacent arm. Two capacitors 22 and 23 are connected in the other two arms of the bridge. A power supply 24, shown as 400 hertz, which is the conventional frequency of aircraft power supplies, is connected across the input terminals of the bridge 21. The output terminals are connected through conductors 25 and 26 to the input terminals of an amplifier 27 whose output is connected to one winding 28 of a two-phase motor 30. The other winding 31 of the motor 30 is connected in series with a capacitor 32 across the terminals of the power supply 24.

Capacitor 22 is a variable capacitor controlled by the motor 30. A pointer 34 also driven by the motor 30 cooperates with a scale 35 which indicates the quantity of fuel in the tank.

When it is desired to check the capacitors 2 and 3, it can be done simply by withdrawing the probe 4 from the tank, which is permitted by the slack wire connections. Electrical access to the capacitors 2 and 3 individually can be obtained at the terminals 10, 11 and 12 when the fault isolation probe is withdrawn from the tank. In this way, the integrity of the capacitors 2 and 3 may be checked without disturbing their location. Note that capacitor 2 is so located in the tank that it is accessible only with great difficulty, as may be seen in the case of the level measuring capacitor 47 of FIG. 4. If the system is not functioning properly, it can thus be readily determined whether the fault lies in one of the capacitors 2 and 3 or in some other part of the system.

FIGS. 2—5

These figures illustrate a more complex fuel supply system for an aircraft. There is shown in FIG. 2 an aircraft wing 40 separated by bulkheads 41 and 42 into end tanks 43 and 44 and a center tank 45. In each of the end tanks 43 and 44, there is provided one compensating capacitor shown at 46 and indicated by an octagon. The center tank 45 has two compensating capacitors 46. Each tank has a plurality of level measuring capacitors 47, shown by circles in the drawing. Each capacitor is connected to a fault isolation probe 48, illustrated by an ellipse in the drawing. Each probe 48 serves as a junction point for the connection of several capacitors 47, as illustrated in FIG. 2. In some cases the capacitors are connected to their fault isolation probes through bulkhead connectors, as shown at 50 in the case of the level measuring capacitors 47 in the wing tip portions of the end tanks.

Each fault isolation probe 48 is connected by means of a power supply cable 51 to one of a plurality of master digital indicators 52, 53 and 54. The power supply cables 51 pass through bulkhead connectors where required, as shown diagrammatically at 55. The master indicator 52 displays the fuel quantity in the left end tank 43. The master indicator 53 displays the fuel quantity in the center tank 45. The master indicator 54 displays the fuel quantity in the right end tank 44.

Each of the master indicators is provided with a test switch 52a, 53a, 54a, which is a three-position switch movable from a normal center position either to a left-hand position marked C, or a right-hand position marked S. The master indicators 52, 53, and 54 are located in a cockpit panel 65, which is also provided with a "Press-to-Test" switch 67. When checking the indicator, the press-to-test switch is first used. This switch should cause all three master indicators to read 99900. If that test secures the correct reading on all three indicators, then the capacitors associated with the respective indicators may be tested by using one of the three-position switches 52a, 53a, 54a. This switch is first moved to its S position. In that position capacitors of fixed value are substituted for capacitors 46 and 47 in the fuel measuring circuit, so that the master indicator should read at a particular value, e.g., 10500. If that test turns out correctly, then the switch 52a is turned to the C position, in which a fixed capacitor is substituted for the measuring capacitors 47, but the compensating capacitor 46 is left in the circuit. Under these circumstances, the master indicator should read, for example, 13900 if the tank is completely dry and 10,500 if the compensating capacitor is covered with fuel.

Each of the three master indicators 52, 53 and 54 controls one of three repeater digital indicators 56, 57 and 58, one for each of the fuel tanks. The repeater indicators are located in a refueling panel 60 at a convenient location on a wing of the aircraft where they are visible to the person in charge of filling the fuel tanks. Each of the repeater indicators is provided with a fuel selector indicator, shown respectively at 56a, 57a and 58a. The fuel selector indicators are settable manually by set knobs 56b, 57b, 58b. Each repeater indicator is also provided with a test button 56c, 57c, 58c.

Each repeater indicator also includes a digital fuel quantity indicator 56d, 57d, 58d. These indicators repeat the indication of the master indicators. Each repeater indicator controls a fuel valve 59 for its associated tank, and closes that valve whenever the fuel quantity indicator reading is equal to or greater than the fuel selector indicator reading. When the fuel quantity indicator reads less than the fuel selector indicator, then the fuel valve 59 may be opened.

The refueling panel 60 also includes a press-to-test switch 68. When that switch is actuated, the fuel quantity indicators 56d, 57d, 58d on the refueling panel should all read 99900.

The master indicators 52, 53 and 54 control a totalizer 66, located in the cockpit panel 65, and having a fuel quantity indicator 66a, which indicates the total weight of fuel in all three of the tanks. The indicator 66 is also provided with a gross weight indicator 66b which is settable by means of a knob 66c to a value equal to the weight of the aircraft plus its load when its fuel tanks are empty. After this indicator is manually set, the system can be started and will supply to the indicator 66b additional fuel weight data which is summed with the previous figure of the weight of the aircraft without fuel to give a figure for the gross weight of the aircraft with fuel.

FIG. 3 illustrates in greater detail the connections between the master indicators 52, 53 and 54, the totalizer indicator 66 and the repeater indicators 56, 57 and 58. The tank 43 is shown diagrammatically as including three fuel level capacitors 47 and one compensating capacitor 46.

Also shown in FIG. 3 is a section of the cable 51 connecting the master indicator 52 to the capacitors 46 and 47 in the tank 43. As there shown, the cable 51 comprises an inner conductor 70 provided with a coaxial cylindrical shield 71. The return conductors 72 and 73 from the low voltage sides of the capacitors 46 and 47 are shown as being wound helically around the shield 71. The shield 71 is suitably insulated from the conductor 70 and the entire cable is covered with an insulating sheath 74.

Figure 4:
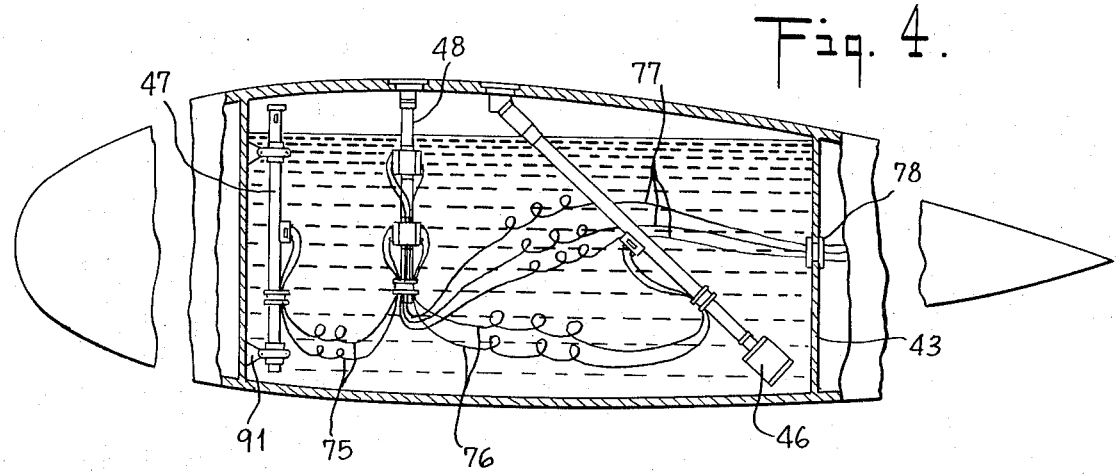
FIG. 4 is a cross-sectional view through the wing tank of an aircraft illustrating a fuel measuring capacitor, a compensating capacitor, and a fault isolation probe, in their normal operating positions.
Figure 5:
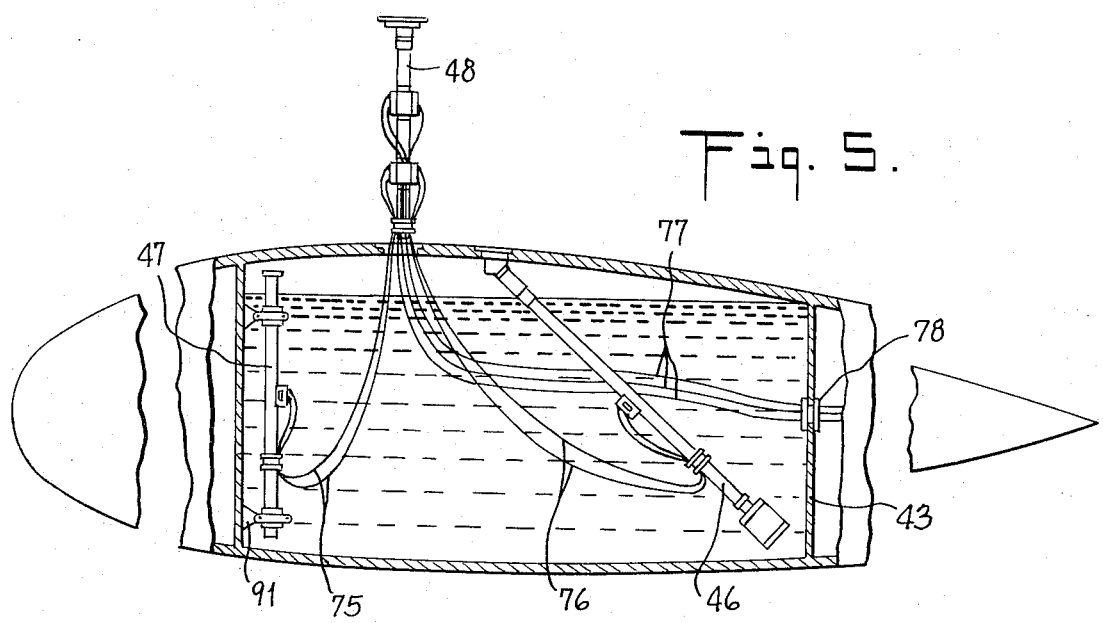
FIG. 5 is a view similar to FIG. 4, but showing the fault isolation probe withdrawn for inspection or test purposes.

FIGS. 4 and 5 show a fore and aft section through the tank 43, illustrating one of the fuel level capacitors 47, the compensating capacitor 46 and the fault isolation probe 48. The level measuring capacitor 47 is connected to the fault isolation probe by slack conductors 75. The compensating capacitor 46 is connected to the fault isolation probe by means of slack conductors 76. Another set of slack conductors 77 connect the fault isolation probe 48 to a rigid connector 78 mounted in a bulkhead wall in the tank 43.

It may be seen by comparing FIGS. 4 and 5 that the fault isolation probe 48 may be lifted out of the tank, without disturbing the capacitors 46 and 47. After it is so lifted, any of the capacitors connected to it may be individually tested by disconnecting the wires connected to that capacitor from the terminals on the probe 48. The conductors 75, 76 and 77 are sufficiently slack so that the probe 48 can be completely removed from the tank without applying strain to any of the wires.

FIGS. 6–17

FUEL LEVEL MEASURING CAPACITOR

One of the fuel level measuring capacitors 47 is shown in detail in these figures. It comprises an outer elongated cylindrical plate 81 and a concentric inner cylindrical plate 82. The capacitor 47 is best seen in an overall view in FIG. 6, and in a sectional view in FIG. 16. As shown in FIG. 16, the inner cylinder 82 is contoured along its length, having a larger diameter portion 82a along its middle section and smaller diameter end portions 82b and 82c. The purpose of the contouring is to make the capacitance of the capacitor vary as a function of the cross-sectional area of the tank. It will be understood that aircraft fuel tanks are not geometrically regular in shape. Consequently, in order for a given increment of fuel level to produce the same incremental change in capacitance at all levels within the tank, it is common to contour the capacitors as done in the case of the inner plate 82. For the same purpose, it is also common to select the number and spacing of the fuel level measuring capacitors, as indicated diagrammatically in FIG. 2. This contouring of the capacitors and the number and spacing of the capacitors involve complex mathematical computations related to the contour of the individual tank. Very often these computations are performed by computer.

The outer plate 81 is mounted on a pair of brackets 83, shown generally in FIG. 6 and in detail in FIGS. 7 and 9. Each bracket 83 comprises two semicircular bands 84 and 85 having lugs 84a and 85a projecting radially outwardly from each of their ends. The lugs 84a, 85a at the right end of FIG. 7 are fastened together by a bolt 86 and nut 87. The lugs 84a, 85a at the left of FIG. 7 are fastened together by another bolt 88 and nut 89, which also fasten those lugs to a yoke 91, forming part of the permanent structure of the fuel tank. See FIGS. 4 and 5. The brackets 83 loosely encircle a slidable mounting collar 92 (FIG. 9) and a fixed mounting collar 93 (FIG. 15), of channel-shaped cross-section. By making collar 92 slidable and collar 93 fixed to the capacitor, the collars adapt readily to dimensional variations, e.g., due to temperature or tolerance limits without stressing the capacitor. The collars 92 and 93 are notched as shown at 92a in FIG. 7 to receive a pair of lugs 84c and 85c projecting from the bands 84 and 85 of the brackets 83. The bands 84 and 85 are spaced slightly outwardly from the collars 92 and 93 by resilient sinuous spring members 94. The collars 92 and 93, on the other hand, fit tightly around the capacitor plate 81. The assembly of the brackets 83, springs 94 and collars 92 and 93 provide a resilient mounting for the capacitor plate 81, so that it is not subjected to shocks transmitted from the frame of the aircraft.

The inner plate 82 is mounted within the outer plate and is fixed against movement with respect to the outer plate. The mounting for the inner plate 82 includes a pair of diametrically extending pins 95 (FIGS. 14 and 15) which extend through the plates 81 and 82 and also through a sleeve 96 which is integral with the collar 93. The pins 95, as best seen in FIG. 15, lie in planes extending axially of the capacitor plates 81 and 82, which planes are perpendicular to each other. The pins 95 may be made of any suitable insulating material. The ends of the pins 95 are upset to hold the pins in place.

The pins 95 support the inner plate 82 against longitudinal movement and against rotational movement with respect to the outer plate 81. At spaced intervals along the plates 81 and 82, there are provided rows of spacer buttons 97, best seen in FIGS. 16 and 17. The buttons in each row are preferably spaced both circumferentially and axially from one another, as shown. Each button 97 extends radially and has at its outer end a convex surface 97a which engages the inner surface of the outer plate 81. The inner end of each button 97 has a projecting shank 97b surrounded by a shoulder 97c. The shank 97b extends through an aperture in the inner plate 82. The shoulder 97c abuts against the outer surface of the inner plate 82. The rows of insulating buttons 97 serve to maintain the inner plate 82 against lateral movement with respect to the outer plate 81. In other words, these buttons maintain the concentricity of the two plates.

The capacitance of each capacitor 47 may be adjusted for purposes of calibration by means of a sleeve 100 (FIGS. 10 and 11) which fits inside the upper end of the plate 81 and is provided at its upper end with an outwardly projecting flange 100a, by which the sleeve 100 may be gripped for rotational adjustment. The plate 81 has a pair of axially elongated windows 81a, best seen in FIGS. 10 and 11. The sleeve 100 also has a pair of axially elongated windows 100b, also best seen in FIGS. 10 and 11. By rotating the sleeve 100 within the plate 81, the effective surface area of the outer plate 81 which is directly opposite to the surface of the inner plate 82 may be varied, thereby varying the capacitance of the capacitor for a given dielectric material between the plates. The sleeve 100 is provided with a plurality of protuberances 99 near its lower end, to maintain a frictional grip on the plate 81, which grip is nevertheless readily movable.

Near the upper end of the cylindrical plate 81 there are provided a pair of peripherally extending slots 81b for receiving a pair of clamping screws 101 (FIG. 10), which threadedly engage the sleeve 100. A pair of contact strips 98 (FIG. 11) are provided along the slots 81b, the strips 98 being riveted to uncoated areas on the plate 81. The screws 101 and strips 98 provide electrical contact between the plate 81 and sleeve 100. The capacitance of each capacitor 47 is calibrated at the factory to a tolerance of ±0.05 picofarad (about one part in 3,000). The system of FIGS. 2 and 3 is designed to operate at a frequency of 10 kilohertz. Since it is desired that this adjustment not be disturbed by adjustments made in the field, the setting at the factory is locked by means of a strap 102 which encircles the plate 81 and covers the heads of the screws 101. The ends of the strap 102 are fastened together by means of a rivet or eyelet 103, so that the strap cannot be removed except by cutting either the strap or the rivet.

When the capacitor 47 is in place in the aircraft, it normally extends vertically. Since the wires 75 attached to it are to be slack, they extend downwardly. There is mounted on the surface of the outer plate 81, an insulating terminal board 104 having thereon a pair of terminals 105 connected to the respective plates of the capacitor. A strain relief clamp 106 is also mounted on the terminal board to prevent transmission of strain through the wires to the terminals 105. From the strain relief clamp 106, the wires pass under another strain relief clamp 107, which encircles the plate 81 below the terminal board 104. The details of construction of the strain relief clamp 107 are similar to those of the corresponding clamp shown in FIG. 22 in connection with the compensator capacitor, and described in connection with that figure. The clamps 106 and 107 hold the wires in position on the probe 47, when the wires are disconnected from the terminals for the purpose of testing the capacitors individually.

A shield plate 108 is provided between the terminals 105 and the capacitor plate 81. The shield plate 108 has bent-up end portions 108a and 108b, which are riveted to the terminal board 104. A central portion 108c of the shield plate 108 is bent upwardly and extends through an opening in the terminal board 104 to provide a guard shield between the two terminals 105. An insulating sheet 109 separates the shield plate 108 from the capacitor plate 81. The shield plate 108 is provided with suitable apertures to allow passage of wires connecting the terminals 105 to the capacitor plates 81 and 82, as shown in FIG. 6A.

FIGS. 18–26

COMPENSATING CAPACITOR

These figures illustrate one of the compensating capacitors 46 shown diagrammatically in FIG. 2 and more graphically in FIGS. 4 and 5. Each compensating capacitor is intended to be located near the bottom of its fuel tank, so that its capacitance varies only with changes in the dielectric constant of the fuel in the tank, and not with changes in fuel level. Each compensating capacitor is mounted on a flanged plate 111 which is adapted to be inserted in a mating opening in an upper surface of an aircraft wing 40. The skin of the wing 40 serves as both wing surface and as the upper wall of the fuel tank. The plate 111 has a flange 111a extending around its periphery and adapted to fit within a recess 40a in the upper surface of the wing 40. A plurality of flush head screws 112 extend through the flange 111a and a corresponding flange 40b on the wing 40. The lower ends of the screws 112 are received in dome nuts 113. Each dome nut 113 is fastened to the flange 40b of the airplane wing by means of rivets 114 having flush heads. The heads of the rivets 114 are nominally flush with the surface of the flange 40b. Nevertheless, in some instances the head of a rivet 114 may project slightly above the surface 40b, because of a build up of tolerances in the dimensions of the rivet, the wing flange 40b and the dome nut 113. It is desirable to maintain as good electrical contact as possible between the wing flange 40b and the flange 111a of plate 111, so as to facilitate the discharge of lightning which might otherwise discharge rapidly from a projecting rivet head, thereby creating a spark. In order to prevent such spark discharges, the flange 111a is provided with recesses 111b in alignment with each rivet head, and somewhat larger in diameter than the rivet head, so that the rivet head may project upwardly slightly above the surface of the flange 40b without coming into contact with the under surface of the flange 111a.

Sealing rings 115, which may be O-rings, are provided between the plate 111 and the inner periphery of the flanges 40b.

Mounted on the under side of the plate 111 by means of screws 116 is a block 117 having a slanting face on which is fastened a flange 120 attached to a resilient sleeve 121 which encircles and is attached to the upper end of a support tube 122. A 118 and an O-ring wave washer 119 cooperate with the sleeve 121 and flange 120 to provide a resilient support for tube 122.

At its lower end, the support tube 122 carries six concentric cylindrical plates, respectively identified by the numbers 123, 124, 125, 126, 127 and 128.

Figure 26:
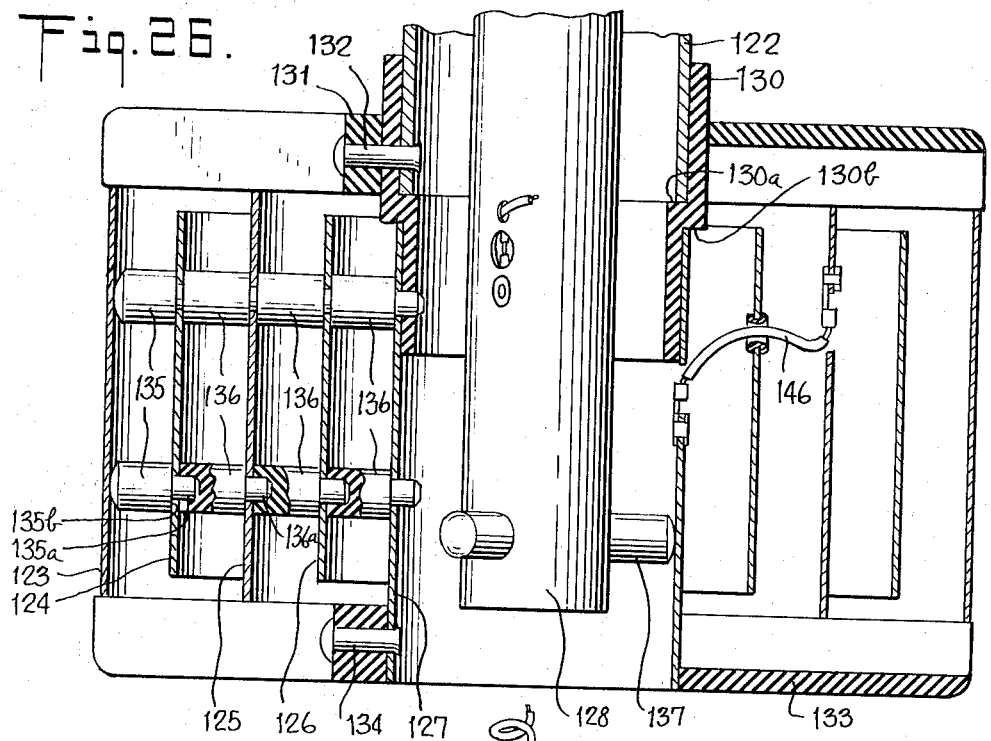
FIG. 26 is a sectional view on the line 26—26 of FIG. 23.

An insulating sleeve 130 encircles the lower end of the tube 122 and is provided with an internal shoulder 130a, against which the end of the tube 122 abuts. The sleeve 130 also has an external shoulder 130b spaced downwardly from the shoulder 130a, against which the upper end of the cylindrical plate 127 abuts. The sleeve 130 and a spider 131 of insulating material are connected to the lower end of the tube 122 by means of a plurality of rivets, one of which is shown at 132. Another insulating spider 133 is attached to the lower end of the cylindrical plate 127 by means of rivets, one of which is shown at 134. The spiders 131 and 133 engage the ends of the plates 123 and 125 and hold them against axial movement. The plates 123, 124, 125, 126 and 127 are restrained against rotational and lateral movement with respect to each other by means of a plurality of rows of interfitting buttons 135 and 136 (FIG. 26). The outermost buttons 135 are similar in structure to the buttons 97 of FIG. 17, having on their outer ends convex surfaces adapted to engage the inner surface of the outermost plate 123. On their inner ends, buttons 135 have a shank 135a encircled by a shoulder 135b. The shank extends through a hole in the next adjacent plate 124 and thence into a recess in the outer end of the next interfitting button 136. The shoulder 135b engages the outer surface of the plate 124 around the hole which receives the shank 135a.

The buttons 136 are alike, having on their outer ends a central recess for receiving the shank on the next outer button surrounded by a surface contoured to engage the inner surface of a capacitor plate. Each button 136 has on its inner end a shank 136a which projects through a hole on the next adjacent inner capacitor plate and into the recess on the next button 136. In the structure illustrated, there are two tiers of buttons 135, 136, as may be seen in FIG. 26. Each tier of buttons comprises three rows of buttons 135, 136, as may be seen in FIG. 23. The particular number of tiers of buttons and the particular number of rows are not critical. It is only necessary that a sufficient number of tiers and rows be provided to maintain the cylindrical capacitor plates in proper spaced relation.

The innermost capacitor plate 128 has its lower end maintained concentric with the capacitor plate 127 by means of three buttons 137 similar in structure to the buttons 135. The upper end of the plate 128 is supported by a pin 140 extending diametrically through the plate 128 and also through an insulating ring 141 having a sliding fit within the support tube 122. Spacers 138 encircle pin 140 and maintain the spacing between plate 128 and ring 141. The tube 122 is provided with a pair of diametrically opposite longitudinal slots 122a (see FIG. 22). A pair of screws 142 extend through the slots 122a and into the ring 141. By tightening the screws 142, the axial position of the ring 141 and hence of the plate 128 may be fixed. By loosening the screws 142, the ring 141 and plate 128 may be moved longitudinally of the assembly of capacitor plates to vary the capacitance of the capacitor unit.

This is a calibrating adjustment which is made at the factory. After the adjustment is made, a strap 143 is placed around the screws 142 and the support tubes 122 and has its ends fastened by a rivet or eyelet 144.

Figure 25:
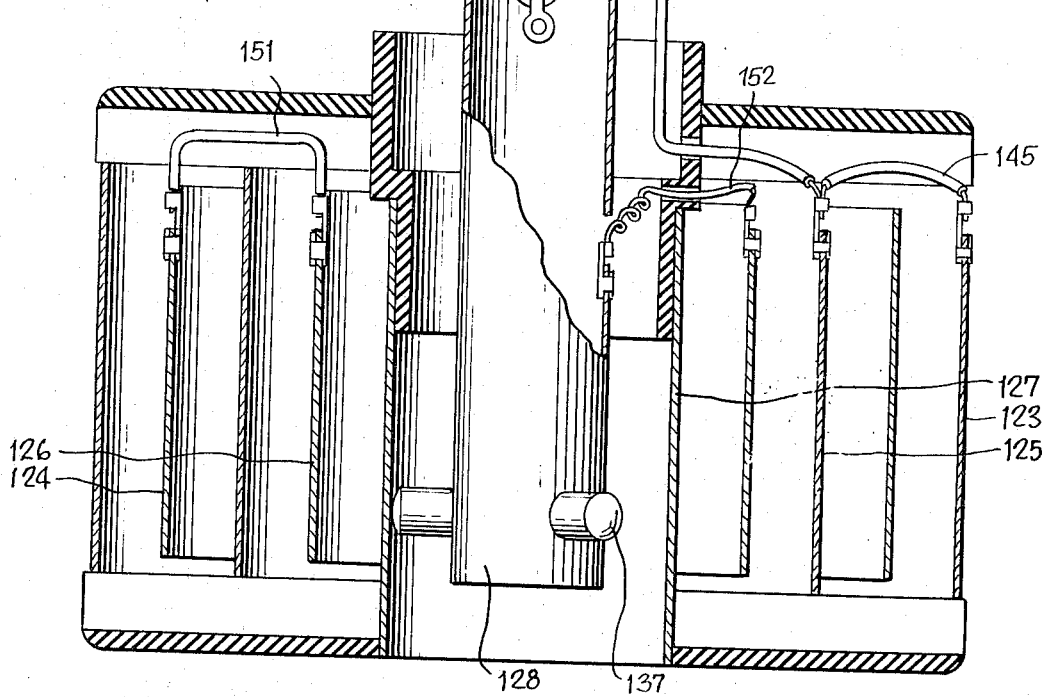
FIG. 25 is a sectional view on the line 25—25 of FIG. 23.

One set of alternate concentric plates 123, 125 and 127 are connected together by conductors 145 and 146 (FIGS. 25 and 26) and through a conductor 147 to a terminal 148 on a terminal board 150 mounted on the outside of the support tube 122. The other set of plates 124, 126 and 128 are connected together by conductors 151 and 152, and by a conductor 153 to another terminal (not shown) mounted on terminal board 150. The conductors 147 and 153 pass between a clamping ring 154 and the support tube 122. The clamping ring 154 is provided with recesses 154a on its inner side to accommodate the conductors. A strap 155 with a toggle connection 156 at its end encircles the ring 154. The ring 154 is made up of two semicircular parts hinged together and held in place by the straps 155. Another strain relief connection 157 is provided on the terminal board 150 to prevent the transmission of any strain through the wires to the terminals 148. The terminal board 150 is provided with a shield plate arrangement, similar to that shown in FIG. 6A.

The capacitors 46 and 47 illustrated are designed to operate at a frequency of about 10 Khz., as stated above. By the use of this frequency, it is possible to use capacitors which are physically much larger than those used in prior art (commonly power frequency) fuel gaging systems. Furthermore, since the capacitors are much larger, and the spacing between the plates is greater, the capacitance of the capacitors is much less affected by minor variations in plate spacing than is the case with the prior art systems. The capacitors are also much less susceptible to contaminants in the dielectric than the prior art capacitors. These contaminants are a major cause of degraded performance in the prior art systems. This is especially important for the compensating capacitors, which are located at the bottom of the tank where contaminants tend to collect. It is therefore feasible to make all calibrating adjustments at the factory and to avoid the necessity and even the desirability of making such adjustments in the field. The locking bands and rivets are provided to cover the calibrating adjustment mechanisms to prevent the field personnel from getting ready access to them.

In the level sensing capacitors 47 shown, the minimum spacing between plates is 0.25 inches, whereas the widest spacing in prior art capacitors was 0.125 inches. In the compensating capacitors 46 shown, the spacing between the plates is 0.470 inches. These figures are presented by way of example to indicate the order of magnitude of the difference between the capacitors of the present invention and those of the prior art.

FIGS. 27-29
FAULT ISOLATION PROBE

These figures illustrate one of the fault isolation probes 48, shown diagrammatically in FIGS. 1 and 2 and more graphically in FIGS. 4 and 5.

The fault isolation probe 48 comprises a support tube 161 flexibly attached at its upper end to a closure plate 162 adapted to engage and cover an opening in an upper wall of an aircraft fuel tank. The tube 161 supports two arrays of low and high voltage terminal blocks, respectively shown at 163 and 164. Each array of terminal blocks is mounted on a plate 165 bent to form an octagonal sleeve encircling the tube 161. The ends of each sleeve 165 are spaced from the tube 161 by a pair of end plates 166 having flanges 166a at their inner peripheries extending along the tube 161 and fastened to the tube by means of rivets 167. The end plates 166 have their outer peripheries bent over toward each other and are fastened by means of rivets 17 to the sleeve 165 and also to insulating terminal boards 172 mounted on the sleeve 165. Each terminal board supports two terminals 173 and is aligned with a strain relief clamp 174 for gripping and holding the wires attached to the terminals, so that no strain can be transmitted through the wires and the terminals. The lower array of terminal blocks 164 has clamps 175 on two of its octagonal faces instead of terminal boards 172. The wires attached to the upper terminals 173 pass through the clamps 174 on the upper terminal boards 172 and thence through clamps 175, thereby preventing accidental contact between the wires 176 and the terminals 173 mounted in the lower array 164 of terminal blocks.

Below the array of terminal blocks, the wires 176 and the wires leading to the terminals 173 of the lower array all pass between a clamping ring 177 and the support tube 161. As pointed out in connection with FIGS. 4 and 5, all of the wires extend downwardly from their terminals 173, and the clamping arrangements provided insure that the wires are kept orderly, regardless of the fact that they are in a slack configuration.

The resilient connection between the tube 161 and the plate 162 includes a resilient insulating sleeve 181 attached to the tube 161 by means of rivets 182. The sleeve 181 is enclosed by a resilient ring flange 183, whose upper flanged end is attached to the plate 162 by means of screws 184.

The upper end of the tube 161 has an outwardly projecting flange, on which rests a spacer 185. A wave washer 186 is provided between the spacer 185 and the plate 162. The whole assembly, including the parts 181, 183, 185 and 186 provides a resilient connection between the tube 161 and plate 162, so that shocks cannot be transmitted between the aircraft wing to the tube 161.

While the invention has been described in connection with a specific embodiment thereof, which is intended for the measurement of the mass of fuel in an aircraft fuel tank, it will be readily understood that the invention is applicable to other fluid measurement problems, where the fluid to be measured is enclosed within a tank. The invention is adaptable to measurement of parameters other than mass, for example, either volume or level. The invention is also applicable to any situation where a fluid having a certain specific dielectric characteristic is enclosed in a tank with another fluid having a different dielectric characteristic, and the fluids are non-miscible so that an observable interface exists.

I claim:
1. Liquid level sensing capacitor means, comprising:
   a. inner and outer concentric cylinders of substantially equal length, said cylinders being open at their ends, said outer cylinder having a longitudinally and circumferentially extending opening therein adjacent one end thereof;
   b. a sleeve rotatably mounted in said one end of the outer cylinder, said sleeve being in electrical contact with said outer cylinder and having an opening therein similar in dimensions to the opening in the outer cylinder; and
   c. means for changing the angular position of the sleeve in the outer cylinder and thereby changing the alignment of said openings and hence the capacitance between the inner and outer cylinders.

2. Liquid level sensing capacitor means comprising:
   a. concentric inner and outer cylinders;
   b. internal means supporting said inner cylinder within said outer cylinder and holding it against longitudinal and rotational movement; and
   c. external support means connected to said outer cylinder to hold said capacitor means in a fixed position;
   d. said cylinders being open at their ends to permit free flow of fluid into the space between the cylinders;
   e. said external support means comprising:
      1. a bracket encircling said outer cylinder, said bracket having an inside diameter substantially larger than the outside diameter of the outer cylinder;
      2. means for mounting said bracket on a fixed support;
      3. a collar of channel-shaped radial cross-section encircling the outer cylinder, said collar having a pair of axially spaced, externally projecting flanges and receiving the bracket between the flanges; the bight of said channel-shaped cross-section having an outside diameter smaller than the inside diameter of the bracket; and
      4. sinuous spring means extending peripherally around the space between the bracket and the bight of the collar, said spring means serving to absorb shocks and vibrations.

3. Liquid level sensing capacitor means comprising:
   a. concentric inner and outer cylinders;
   b. internal means supporting said inner cylinder within said outer cylinder and holding it against longitudinal and rotational movement;
   c. external support means connected to said outer cylinder to hold said capacitor means in a fixed position;
   d. said cylinders being open at their ends to permit free flow of fluid into the space between the cylinders;
   e. said internal support means comprising a pair of diametrically extending pins of electrical insulating material, spaced along said cylinders and located in axial planes substantially at right angles to each other, said pins being of insulating material and extending through apertures in both said cylinders; and f. said external support means comprising a sleeve encircling said outer cylinder, said pins extending radially through said sleeve and being fastened thereto at their ends.

4. Fluid level sensing capacitor means, comprising:

a. inner and outer concentric cylinders of substantially equal length, said cylinders being open at their ends, said outer cylinder having a longitudinally and circumferentially extending opening therein adjacent one end thereof, said outer cylinder also having a circumferentially extending slot;

b. a sleeve rotatably received in said one end of the outer cylinder; said sleeve having an opening therein similar in dimensions to the opening in the outer cylinder;

c. a contact plate riveted to said outer cylinder alongside said slot; and d. a screw extending through said slot and having a head engageable with the contact plate, said screw threadedly engaging said sleeve, said screw and plate providing an electrical connection between the plate and sleeve when the screw is tightened to fix the angular position of the sleeve in the outer cylinder, said screw being releasable to permit rotation of the sleeve to change the alignment of said openings and hence the capacitance between the inner and outer cylinders.

5. Fluid level sensing capacitor means as in claim 4, including:

a. a locking band encircling said outer cylinder and the head of said screw, said locking band having its ends permanently connected to prevent change in the capacitance except by deformation of the permanent connection between the ends of the band.

6. Adjustable capacitor means, comprising:

a. inner and outer concentric cylinders, said outer cylinder having an elongated slot;

b. a sleeve movable in the outer cylinder;

c. means connected with said sleeve and effective upon movement thereof in the longitudinal direction of the slot to vary the capacitance between the inner and outer cylinders;

d. a screw extending through said slot and threadedly engaging said sleeve, said screw having a head overlapping the outer cylinder adjacent the slot, and being effective when tightened to fix the position of the sleeve in the outer cylinder; and e. a locking band encircling said outer cylinder and the head of said screw, said locking band having its ends permanently connected to prevent change in the capacitance except by deformation of the permanent connection between the ends of the band.

* * * * *

UNITED STATES PATENT OFFICE
CERTIFICATE OF CORRECTION

Patent No. 3,798,515            Dated March 19, 1974

Inventor(s) Sebastian F. DiGiacomo

It is certified that error appears in the above-identified patent and that said Letters Patent are hereby corrected as shown below:

In the Title, (Cover Sheet and Column 1), Delete "Mass of".

Col. 1, line 11, after "1972" insert -- and assigned to the assignee of this invention --.

Col. 9, line 18, after "A" insert -- wave washer --; same line, delete "wave";

line 19, delete "washer".

Signed and sealed this 4th day of March 1975.

(SEAL)
Attest:

RUTH C. MASON
Attesting Officer

C. MARSHALL DANN
Commissioner of Patents
and Trademarks